United States Patent [19]
Kellermann

[11] 3,864,523
[45] Feb. 4, 1975

[54] METHOD FOR TESTING A MULTIPLEX TRANSMISSION SYSTEM

[76] Inventor: Reiner Kellermann, Schaferstr. 16, 407 Rheydt, Germany

[22] Filed: June 6, 1974

[21] Appl. No.: 477,312

[30] Foreign Application Priority Data
Feb. 23, 1972 Germany.................... 2208364

Related U.S. Application Data

[63] Continuation-in-part of Ser. No. 334,437, Feb. 21, 1973, abandoned.

[52] U.S. Cl............................................ 179/15 BF
[51] Int. Cl............................................ H04j 3/12

[56] References Cited
FOREIGN PATENTS OR APPLICATIONS
1,116,727  11/1961  Germany.................... 179/15 BF
1,271,209   6/1968  Germany.................... 179/15 BF

*Primary Examiner*—Ralph D. Blakeslee
*Attorney, Agent, or Firm*—Robert D. Yeager, Esq.

[57] ABSTRACT

A method for testing multiplex transmission systems which includes generating a number of different square wave impulse sequences where each of the impulse sequences comprises at least four intervals, the first and third interval defining first and second command intervals, respectively, and the second and fourth intervals defining first and second test intervals. At least one test signal having a first and second signal level is generated. The first signal level is generated during the first command and first test intervals and the second level is generated during the second command and second test interval. Command signals are transmitted through the multiplex system by means of the impulse sequences during the first and second command intervals, each of the impulse sequences being simultaneously transmitted therethrough together with the test signal wherein the first test signal level is transmitted during the first test interval and the second test signal level is transmitted during the second test interval. The transmitted test signals are compared with the generated test signals during their respective test intervals to detect any error in the multiplex transmission system.

4 Claims, 4 Drawing Figures

METHOD FOR TESTING A MULTIPLEX TRANSMISSION SYSTEM

PRIOR APPLICATIONS

This is a continuation-in-part of application Ser. No. 334,437, filed Feb. 21, 1973, now abandoned.

FIELD OF THE INVENTION

The present invention relates to a method for checking or testing a multiplex transmission system.

BACKGROUND OF THE INVENTION

Multiplex transmission means are used for transmitting alarms or signals between points of limited distance from each other, for example, between a machine tool and a data processing center. Multiplex transmission has become widely used for this and other purposes, and it is highly desirable to maintain the highest consistency of performance as well as functional reliability. Accordingly, it is desirable to have available methods and means for testing and checking the multiplex transmission apparatus as well as transmission lines. This testing or checking should be capable of not only being carried out quickly, but also on a relatively regular and frequent basis. Moreover, the checking or testing should be able to detect ground shorts in the multiplex transmission means, breaks in the transmission means, and defects in the blocks required for transmission.

It is, therefore, an object of the present invention to provide a method for detecting ground short circuits in transmission means, breaks in the transmission means and defects within the blocks required for transmission of a multiplex system. It is a further object of the present invention to provide a method by which defects in multiplex transmission are quickly recognized so that no false command signals will occur.

SUMMARY OF THE INVENTION

The present invention provides a method for quickly analyzing the condition of a multiplex transmission means including the transmission lines between the various components of the system. Generally, the method of the present invention comprises generating a plurality of square wave sequences or sequence impulses. Each cycle of each sequence impulse is itself divided to provide sequentially a first command interval, a first testing interval, a second command interval, and a second testing interval. Preferably, each of the command intervals and each of the testing intervals is of equal duration, and the duration is preferably determined by the particular requirements of the equipment utilized.

Typically, a number of different square wave impulse sequences are generated which number corresponds to the number of command signals to be transmitted. Thus, the frequency of each of the square wave impulse sequences is different from the other during the first and second command intervals of a cycle. However, during the first and second testing intervals, the command sequence waves are preferably the same. The command signals which are sent to a multiplexer are transmitted in the form coded by the sequence frequency of the associated wave to a demultiplexer and subsequently to a command analyzer during the first and second command intervals.

The square test sequence waves generated for sending test signals are transmitted through the system simultaneously with the other generated waves during the first and second testing intervals. During either the first or second testing interval, the test signal having two signal levels, preferably a log O $\triangleq$ low-potential and a log L $\triangleq$ high-potential signal, is sent which either tests the condition of the wiring between the square wave oscillator of the multiplexer system, the multiplexer, and demultiplexer or for breaks or short circuits in the multiplexer and demultiplexer. Thus, the first signal level is transmitted during the first testing interval and the second signal level is transmitted during the second testing interval. The test signals are then sent simultaneously to a condition analyzer and a recorder for checking the composition and condition of the test signal.

The method also includes generating a square wave control signal for controlling the command transmission time during the first and second testing intervals. The sequence frequency equal to the duration of one transmission unit. A further sequence is generated having a frequency equal to the command intervals and testing intervals which is used to select the interval in the condition analyzer.

The method of the present invention provides extremely fast checks on the condition of the multiplex system, particularly short circuits in the multiplex means, breaks in the multiplex means, and defects within the blocks and/or equipment utilized for transmission.

In the preferred embodiment of the invention, the command and/or testing signals are sent to a command analyzer by way of a time filter which suppresses stray line signals having a duration shorter than the interrogation time for a command. In order to recognize the transmission condition in the time filter, a third auxiliary signal is generated which is used to interrogate the command signal conditions. The third auxiliary signal is also used in the condition analyzer for controlling interrogation of the test signals.

Other advantages of the present invention will become apparent from a perusal of the following detailed description taken in connection with the accompanying drawings.

PRESENTLY PREFERRED EMBODIMENT

Figure 1:
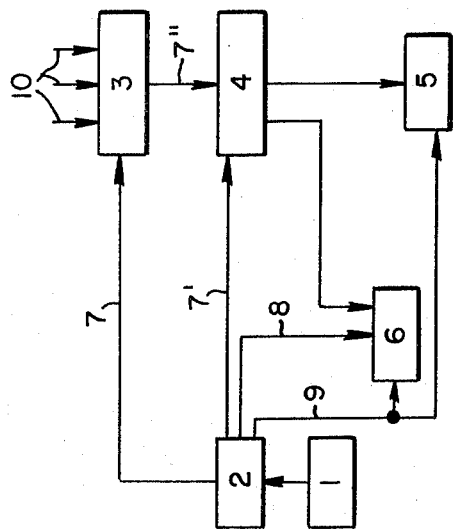
FIG. 1 is a block diagram of the multiplex transmission system suitable for carrying out the method used in the present invention.

Referring to FIG. 1, the multiplex transmission system includes a signal generator 1 for generating test signals and is connected to a square wave oscillator or generator 2 for generating the wave sequences or sequence impulses used to carry the command and test signals. Square wave oscillator 2 is electrically connected to a multiplexer 3 by means of line 7 and to demultiplexer 4 by means of line 7'. Multiplexer 3 is connected for transmission to demultiplexer 4 by means of line 7''.

Demultiplexer 4 is electrically connected to command analyzer 5 which examines the condition and composition of all command signals fed to it by demultiplexer 4. Depending upon the nature of the signal examined, they are either stored as commands or are suppressed. The signals are also compared to a third auxiliary reference signal generated by oscillator 2 and sent to analyzer 5 by means of line 9. This auxiliary signal permits the analyzer to determine the noise or interference level of the transmission means, and, in particular, multiplexer 3 and demultiplexer 4.

Figures 3, 4:
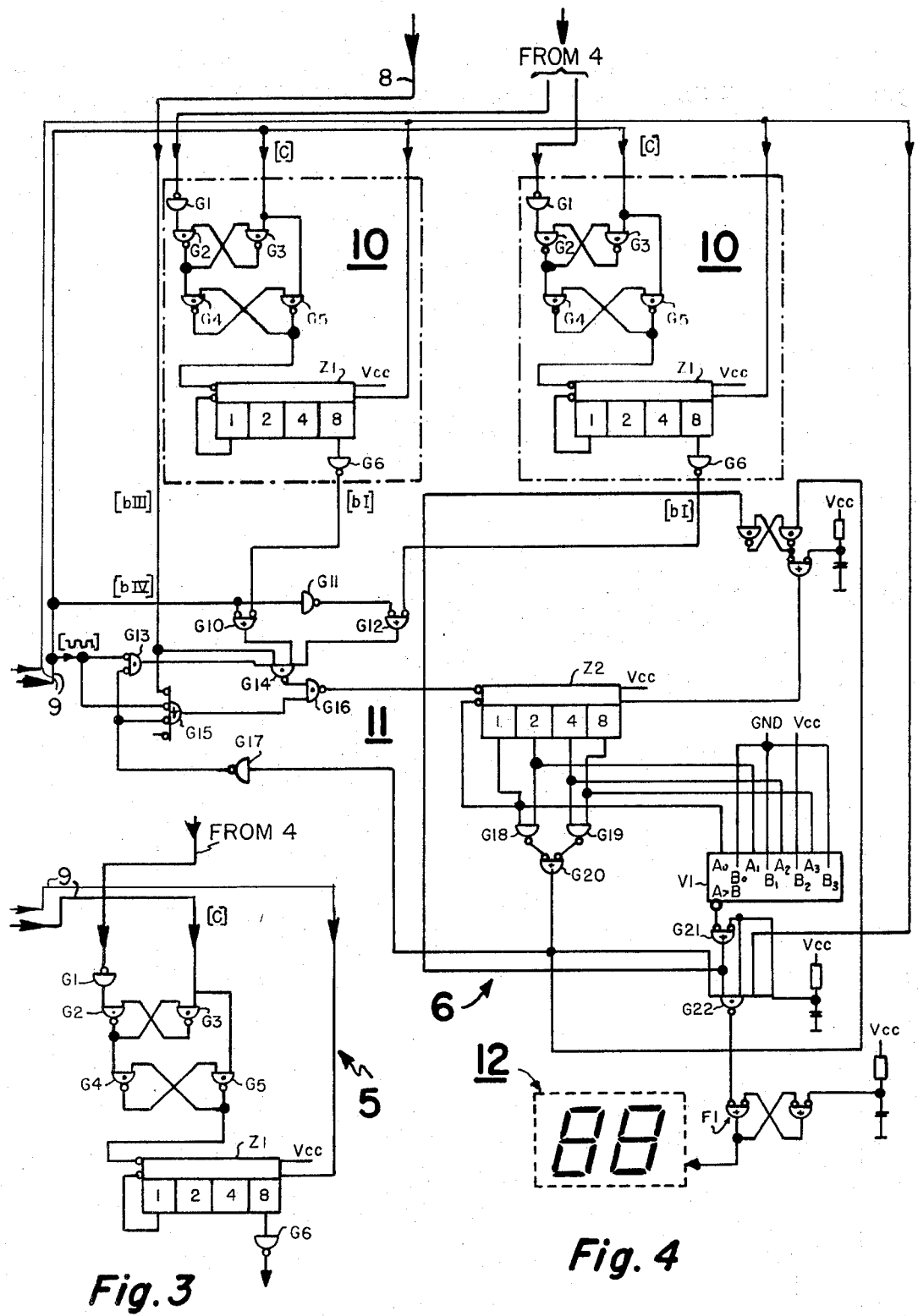
FIG. 3 is a circuit diagram of input filter of command analyzer 5 shown in FIG. 1 in block form.
FIG. 4 is a circuit diagram of condition analyzer 6 shown in FIG. 1 in block form.

With reference to FIG. 3, command analyzer or input filter 5 preferably comprises inverter G1 having its input connected to the output of demultiplexer 4. The output from inverter G1 is inputted to NAND gate G2. The output of NAND gate G3 is also inputted to gate G2. The inputs to NAND gate G3 comprise the output signal from gate G2 and third auxiliary signal [C] from oscillator 2 carried by line 9.

The output from gate G2 is inputted to NAND gate G4 which has on its other input the output of NAND gate G5. The inputs to gate G5 consist of the output from gate G4 and auxiliary signal C, line 9. The output of G5 together with signal C are inputted to counter Z1, preferably a 4-bit binary counter such as a SN7493N manufactured by Texas Instruments. The output from counter Z1 is directed through inverter G6. Command analyzer 5 passes command transmission signals to a machine tool or the like only if the signal phase corresponds to at least one-third of the signal interrogation time.

A test signal condition analyzer 6 is electrically connected to oscillator 2 by means of line 8 and to demultiplexer 4. Analyzer 6 is utilized to check the condition and composition of the test signals during a test interval. After the signals are analyzed by condition analyzer 6, the signal conditions are reported during the subsequent interval either as a "transmission means okay," a "break," or a "short circuit" condition. Analyzer 6 is also electrically connected to oscillator 2 through line 9 which carries auxiliary signal C used for analyzing the noise and interference of the transmission means.

With reference to FIG. 4, test signal condition analyzer 6 preferably comprises two operation elements: a pair of condition time filters 10, which are identical to input filter 5 and thus have similar reference numerals for corresponding components and an operations comparator 11. The outputs from filters 10, inverters G6, to NAND gates G10 and G12, respectively, of comparator section 11.

Comparator 11 comprises NAND gates G10, G12–G22, inverter G11, counter Z2, identical to counters Z1, and comparator V1, preferably a 4-bit magnitude comparator such as an SN7485N manufactured by Texas Instruments. These components carry out a comparison (9 times as shown with respect to $b$II of FIG. 2) during the testing interval of transmitted signal $b$I and reference signal $b$IV. Thus, if there is equality during half of the inspection time, then it is known that there exists no breaks, short circuits and the like.

However, if an equality is not achieved, then there is a malfunction. To indicate errors in transmission, analyzer 6 includes function memory F1 consisting of two gates electrically connected to form a flip-flop circuit. The output from memory F1 is inputted into a registering device 12 which indicates a defect in the multiplexer transmission line.

Figure 2:
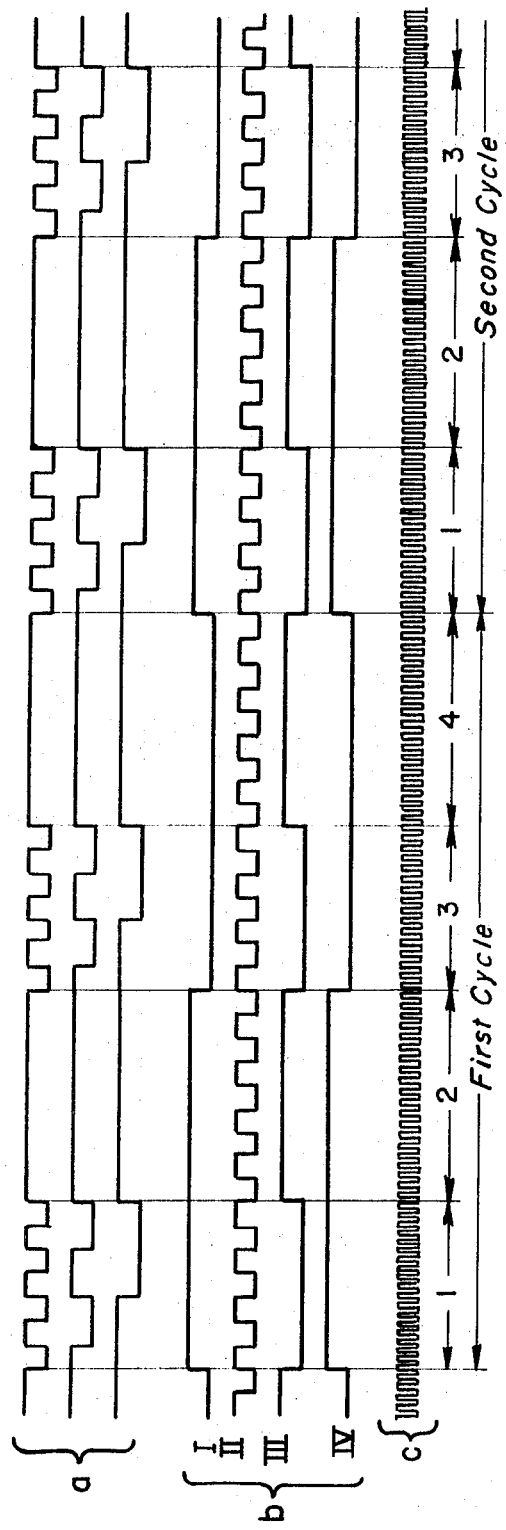
FIG. 2 shows the waves generated in accordance with the method of the present invention.

Referring to FIG. 2, the sequence waves or sequence impulses generated by oscillator 2, in accordance with the invention, are shown. As can be seen, each sequence generated has a cycle which is divided into four intervals. The first and third intervals of each cycle comprises the first and second command intervals, respectively, and the second and fourth intervals of each cycle comprises the first and second testing intervals, respectively. The sequences combined under reference $a$ are the most important, and are, in reality, superimposed upon each other. Sequence impulses $a$ are sent to multiplexer 3 and demultiplexer 4 by means of lines 7 and 7', respectively. By means of sequence impulses $a$ (three different sequences shown) command signals 10, FIG. 1, are transmitted from multiplexer 3 to demultiplexer 4 during the first and second command intervals. During this interval in the preferred embodiment, the commands are sent to command analyzer 5 where they are examined and stored as commands or suppressed.

Command analyzer or input filter 5 interrogates the command signal conditions by means of gates G1 to G6 and counter Z1. Auxiliary signal C is used to change the interrogation, i.e. whenever auxiliary signal C changes sides the control conditions are interrogated. The interrogation is carried out during each signal interval, where a signal interval corresponds to sequence $b$II.

In the method of the presently preferred embodiment, FIG. 2, the command signals are transmitted with the condition log O $\underline{\Lambda}$ low-potential. The input filter 5 passes the transmission signals on only if the signal phase corresponds to at least one-third of the signal interrogation time, if the signal falls short this time, for example, due to transmission interference or where there is no signal, a condition log L $\underline{\Lambda}$ high-potential will result and no transmission is passed.

During the second and fourth portions of the sequence wave cycles, i.e., the first and second testing intervals, testing signals are sent to multiplexer 3 and transmitted to demultiplexer 4. These signals are used to test for breaks and short circuits. They are sent from demultiplexer 4 to recorder 6 where they are analyzed for the particular test then taking place. If during the first test interval a signal was sent for testing breaks, then in the second test interval the signal for shorts will be sent or vice-versa.

The sequence impulses combined under reference $b$ are used to carry out the testing. Square wave $b$I is sent from oscillator 2 to multiplexer 3 and demultiplexer 4 over lines 7 and 7', respectively. Sequence $b$I has first and second signal levels which are used for determining a break or short circuit in the transmission system. As shown in FIG. 2, sequence $b$I comprises a first level, log L, during the first command and testing interval and a second level, log O, during the second command and testing interval.

Preferably, sequence $b$II is generated for use in controlling the command transmission time during the first and second testing intervals. Sequence impulses II, preferably, have a sequence frequency equal to the duration of one transmission unit.

Sequence $b$III corresponds to the interval time for selecting either "transmission," first and second command intervals, or "testing," first and second testing intervals, and is set from oscillator 2 to recorder 6 by means of line 8.

Sequence $b$IV corresponds to sequence $b$I, but is sent from oscillator 2 to recorder 6 by means of line 9 and is used as a reference signal.

Time filters 10 of test signal condition analyzer 6 are electrically connected to demultiplexer 4 by means of the respective inverters G1. Gate G5 of comparator section 11 is electrically connected to oscillator 2 via line 8 over which signal $b$III is transmitted for selecting the respective command and testing intervals. During the log L condition of signal $b$III, comparator section 11 of analyzer 6 compares the sequence conditions $b$I and $b$IV. That is, during the time sequence $b$II, time filters 10 seek out the signal conditions and the operations comparator consisting of gates G10, G11 and G12 compares the conditions log O $\underline{\wedge}$ low-potential of sequences $b$I and $b$IV.

During the testing interval as shown in FIG. 2, $b$II, the comparison is carried out 9 times with gates G10–G22, counter Z2 and comparator V1. If there is equality during half of the testing time, the system is functioning flawlessly. However, if that condition is not achieved, then function memory F1 is set, which in cooperation with register 12 reports that there is a defect in the multiplex transmission system or has been interferred with.

Sequence wave C is preferably utilized to test the noise or interference level of the transmission means; the level conditions of the lateral changes in sequence C are recognized in a time filter incorporated in analyzer 5. The interference having a duration shorter than the sequence frequency of a command interval is suppressed.

Thus, for testing the multiplex transmission system in accordance with the present invention, a log L signal is sent during an entire first or second testing interval and a log O signal is sent during the entire other testing interval. Depending upon which of the log signals is being sent, a corresponding answer is expected in analyzer 6 which, if not forthcoming, will sum itself up and trigger a flase signal. The false signal can be utilized to control the system in any appropriate way. Since it is preferred to generate the sequence cycles at the rate of about 150Hz, a defective transmission is recognized so quickly that no false command will occur if reports are made correctly in further processing.

For every correct transmission of a log signal during the testing interval, a counter, for example, can be moved up a digit. The answer as to whether there is an error or no error can also be found by interrogating the condition of the counters. If there is no error, the counter is set back again.

While a presently preferred embodiment of the invention is shown and described, it may otherwise be embodied within the scope of the appended claims.

What is claimed is:

1. A method for testing short circuits, line breaks, and the like, in a multiplex transmission system including a multiplexer and a demultiplexer used to transmit command signals for control of machine tools and the like, said method comprising:
   A. generating a number of different square wave impulse sequences, said number of impulse sequences being at least equal to the desired number of multiplex command signals, each of said impulse sequences having at least four intervals, said first and third intervals defining first and second command intervals, respectively, and said second and fourth intervals defining first and second test intervals, respectively, said square wave impulses of each sequence being the same between their respective first and second command intervals and their first and second test intervals;
   B. simultaneously transmitting each of said impulse sequences through said multiplex system;
   C. transmitting through said multiplex system command signals by means of said impulse sequences during said first and second command intervals;
   D. generating at least one test signal having a first and second signal level, said first signal level being generated during said first command and test intervals and said second level being generated during second command and test intervals;
   E. transmitting through said multiplex system said first test signal level during said first test interval and said second test signal level during said second test interval; and
   F. comparing the transmitted test signals with said generated test signals during their respective test intervals to detect any error in the multiplex system.

2. A method as set forth in claim 1 including generating a second square wave test signal having a sequence frequency equal in duration to the shortest command impulse sequence for controlling command sequence interval time during and first and second testing intervals.

3. A method as set forth in claim 1 including the step of generating a third square wave test sequence having a sequence frequency at least as short as the shortest command sequence and transmitting said third test sequence through said multiplex system.

4. A method as set forth in claim 3 wherein said command and test sequences are transmitted to an analyzer after demultiplexing through a time filter and suppressing all signals having a duration shorter than said third test signal sequence.

* * * * *